Nov. 5, 1940.   J. GALTER   2,220,599

MEANS FOR PREVENTING REVERSE ROTATION OF CAMERA WINDING KNOBS

Original Filed April 17, 1940

Inventor
Jack Galter
by James R. McKnight
his Attorney

Patented Nov. 5, 1940

2,220,599

UNITED STATES PATENT OFFICE 2,220,599

MEANS FOR PREVENTING REVERSE ROTATION OF CAMERA WINDING KNOBS

Jack Galter, Chicago, Ill.

Original application April 17, 1940, Serial No. 330,130. Divided and this application August 8, 1940, Serial No. 351,876

3 Claims. (Cl. 242—71)

This is a divisional application of the original application on Turnable means for camera take up spools, Serial No. 330,130 filed April 17, 1940, now Patent No. 2,213,492 of September 3, 1940.

My invention relates to means for preventing rotation of the winding knob of a camera.

The object of my invention is to supply means for preventing the take up spool of a camera from being unwound, by a coiled spring on the shank operable with the walls of the casing itself and without the need of separate clutch inserts. My invention also contemplates such other objects, advantages and capabilities as will later more fully appear and which are inherently possessed by my invention.

While I have shown in the accompanying drawing a preferred embodiment of my invention, yet I wish it understood that the same is susceptible of modification and change without departing from the spirit of my invention.

Figure 1:
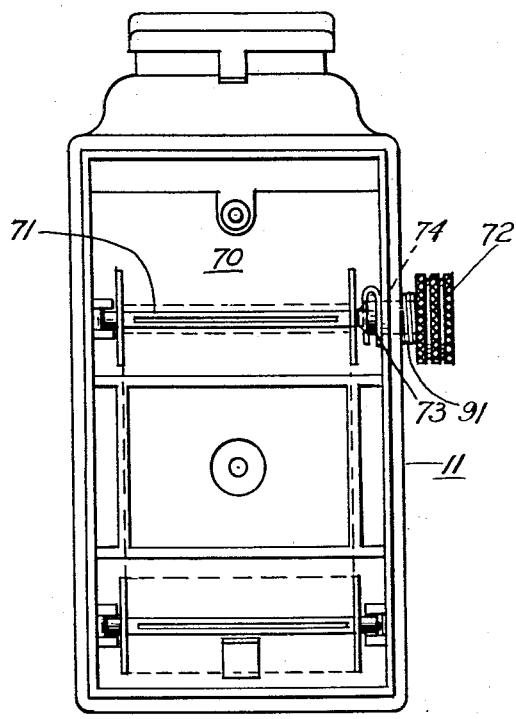
Figure 2:
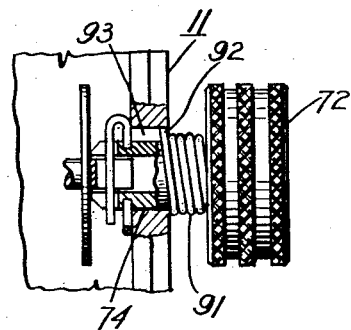
Figure 3:
Figure 4:
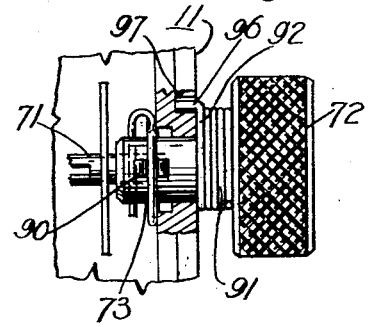
Figure 5:
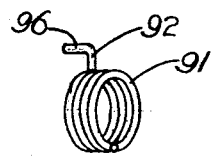

Referring to the drawing, Fig. 1 is an elevational view of the interior of a camera from the rear showing my spring; Fig. 2 is a detail sectional view; Fig. 3 is an elevation of the preferred form of my brake spring; Fig. 4 is a detail sectional view; Fig. 5 is a perspective view of another embodiment of my spring construction.

The embodiment selected to illustrate my invention comprises a camera in which there is a take up chamber 70 for housing the take up spool 71 on which the exposed film is rolled. In order to turn the take up spool 71 from the exterior of the camera I provide a knob 72 having a shank 73 which extends through an opening 74 in the casing 11 into the take up chamber 70.

Suitable means may be provided for the engagement of the shank 73 with the take up spool 71.

A spring 91 is coiled around the inner portion of the shank 73. The spring 91 at its outer end has a straight portion 92 on a radius from the center of the spring. When the shank 73 is inserted into opening 74 in casing 11, portion 92 of spring 91 enters slot 93 provided therefor in casing 11 adjoining opening 74. When the knob 72 is turned in the direction for winding film on the take up spool 71, which is also arranged so that it is the unwinding direction for spring 91, the wall of casing 11 to one side of the slot 93 acts as a clutch and grips portion 92. This permits relative rotation of spring 91 and shank 73. When the knob 72 is turned in the opposite direction, which is also the direction for winding the spring 91, portion 92 is held by the wall on the other side of said slot 93 and spring 91 tightens on shank 73 so that it cannot be turned. This construction prevents undesired unrolling of exposed film on take up spool 71.

A different embodiment shown in Fig. 4 discloses coiled spring 91 with portion 92 plus another portion 96 bent from portion 92 and extending parallel to the axis of the shank 73. When shank 73 is inserted into opening 74 in casing 11, portion 96 enters opening 97 in casing 11 provided therefor. This construction functions the same in use as the other embodiment previously described.

Both of these constructions eliminate the need of a separate insert, may be more easily assembled and result in substantial economies.

While I have described portion 92 as on a radius from the center of spring 91 and portion 96 as extending parallel to the axis of the shank 73, yet I do not wish to be limited to this exact construction as these portions 92 and 96 may extend on any desired angle from the spring 91 to fit within a suitable opening or slot placed therefor in the casing 11.

Having thus described my invention, I claim:

1. A turnable member for the film take up spool of a camera comprising a knob manually operable from the exterior of the camera casing, said casing having an opening, a shank extending from said knob and through the opening in said casing, a spring coiled around said shank adjacent the casing, said casing having a slot adjacent said opening, said spring having an end extending on a radius from the center of the coil, said end being engaged in said slot so that as said knob is turned in the direction of the spring, said direction also being the same direction for winding exposed film on the take up spool, the end of the spring contacts the wall of the casing to one side of said slot and permits the shank to rotate and upon the knob being turned in the other direction the end of the spring contacts the wall of the casing on the other side of the slot so that the spring tightens on the shank and prevents turning.

2. A turnable member for the film take up spool of a camera comprising a knob manually operable from the exterior of the camera casing, said casing having an opening, a shank extending from said knob and through the opening in said casing, a spring coiled around said shank adjacent the casing, said casing having a hole spaced from said opening, said spring having an end extending on a radius from the center of the coil and then bent to form a portion on a line parallel to the axis of the shank, said end being engaged in said hole so that as said knob is turned in the direction of the spring said direction also being the same direction for winding exposed film on the take up spool, the end of the spring contacts the wall of the casing to one side of said hole and permits the shank to rotate and upon the knob being turned in the other direction the end of the spring contacts the wall of the casing on the other side of the hole so that the spring tightens on the shank and prevents turning.

3. A turnable member for the film take up spool of a camera comprising a knob manually operable from the exterior of the camera casing, said casing having an opening, a shank extending from said knob and through the opening in said casing, a spring having a coiled portion around said shank adjacent the casing, said casing having an aperture adjacent said opening, said spring having an engaging portion, said engaging portion being engaged in said aperture so that as said knob is turned in the direction of the spring, said direction also being the same direction for winding exposed film on the take up spool, the engaging portion of the spring contacts the wall of the casing to one side of said aperture and permits the shank to rotate, and upon the knob being turned in the other direction the engaging portion of the spring contacts the wall of the casing on the other side of the aperture so that the spring tightens on the shank and prevents turning.

JACK GALTER.